(12) United States Patent
Esposito (10) Patent No.: US 9,389,074 B2
(45) Date of Patent: Jul. 12, 2016

(54) HANDS-FREE LEVEL

(71) Applicant: The Beny, LLC, Hampton, NH (US)

(72) Inventor: Michael John Esposito, Hampton, NH (US)

(73) Assignee: The Beny, LLC, Hampton, NH (US)

( * ) Notice: Subject to any disclaimer, the term of this patent is extended or adjusted under 35 U.S.C. 154(b) by 136 days.

(21) Appl. No.: 14/469,163

(22) Filed: Aug. 26, 2014

(65) Prior Publication Data

US 2015/0059194 A1 Mar. 5, 2015

Related U.S. Application Data (60) Provisional application No. 61/870,701, filed on Aug. 27, 2013.

(51) Int. Cl.
| | |
|---|---|
| *G01C 9/28* | (2006.01) |
| *E04G 21/18* | (2006.01) |
| *F16B 2/00* | (2006.01) |
| *E04H 12/22* | (2006.01) |

(52) U.S. Cl.
CPC ... *G01C 9/28* (2013.01); *F16B 2/00* (2013.01); *E04H 12/2284* (2013.01)

(58) Field of Classification Search
CPC .............. G01C 9/26; G01C 9/28; F16B 2/00; E04G 21/18
USPC .............................. 33/347, 370, 371, 372, 373
See application file for complete search history.

(56) References Cited

U.S. PATENT DOCUMENTS

| | | | | |
|---|---|---|---|---|
| 3,103,749 | A * | 9/1963 | Dillemuth | G01C 9/00 269/211 |
| 4,580,350 | A * | 4/1986 | Fincher | G01C 9/28 33/334 |
| 4,976,040 | A | 12/1990 | Mish et al. | |
| 5,421,094 | A | 6/1995 | McCord et al. | |
| 6,332,277 | B1 | 12/2001 | Owoc et al. | |
| 2001/0034945 | A1 | 11/2001 | Smochek | |
| 2008/0235967 | A1* | 10/2008 | Gentleman | G01C 9/28 33/372 |
| 2009/0205214 | A1* | 8/2009 | Wong | G01C 9/28 33/371 |

FOREIGN PATENT DOCUMENTS

| | | | | |
|---|---|---|---|---|
| GB | | 787966 A * | 12/1957 | ............. G01C 9/24 |
| KR | WO 2011010838 A2 * | | 1/2011 | ............. G01C 9/28 |
| WO | WO 2015031343 A1 * | | 3/2015 | ............. G01C 9/28 |

* cited by examiner

*Primary Examiner* — R. A. Smith
(74) *Attorney, Agent, or Firm* — Burns & Levinson LLP; Joseph M. Maraia (57) ABSTRACT

Provided are examples of a hands-free level to quickly, accurately, and efficiency level and plumb a wide range of objects regardless of shape. The level includes a stationary component, an adjustable component, a level device attached to the stationary component/adjustable component, and a cord. The cord includes a J-shaped terminus that abuts the adjustable component. Advancing the cord urges the adjustable component towards the stationary component. Complementary locking teeth on the cord and stationary component lock the adjustable component in place and clamps the hands-free level to an object. This lets a user use two hands to hold and move the object while simultaneously checking the object for plumb and/or level.

20 Claims, 12 Drawing Sheets

HANDS-FREE LEVEL

CROSS-REFERENCE TO RELATED APPLICATION(S)

This application claims the benefit of U.S. Provisional Application No. 61/870,701, filed on Aug. 27, 2013, and entitled, "Clamping Bubble Level," the entirety of which is hereby incorporated by reference.

BACKGROUND

A spirit level or bubble level is an instrument designed to indicate whether a surface is horizontal (level) or vertical (plumb). Different types of spirit level maybe use by carpenters, stonemasons, bricklayers, and other building workers, surveyors, millwrights, and other metalworkers, and some photographic and videographic work. Instrument used for plumbing and leveling often require one or two hands to use. As can be seen, there is a need for a hands-free level.

SUMMARY

Described herein are examples of a hands-free level that address the foregoing shortcomings and others as well. In one aspect, at least one example of the hands-free level includes a stationary component including a set of stationary locking teeth formed on a surface of the stationary component, an adjustable component, at least one level device attached to at least one of the stationary component and the adjustable component, and an cord comprising an elongated body terminating in a J-shaped terminus. The cord further includes a set of cord locking teeth formed along a partial length of the elongated body and having an arrangement complementary to the set of stationary locking teeth, such that the set of cord locking teeth and the set of stationary locking teeth engage in a releaseable interlock engagement. The J-shaped terminus of the cord abuts the adjustable component and urges the adjustable component towards the stationary component in response to advancing the cord along the surface of the stationary component.

In other examples, the hands-free level may further include one or more of the following, alone or in any combination. In some examples, the stationary component includes a first clamping surface extending from the surface at a 90° angle and the adjustable component defines a second clamping surface opposed to the first clamping surface. The first clamping surface and second clamping surface may be parallel to each other or at an angle to each other. In other examples, at least of one of the first clamping surface and the second clamping surface is textured. In some examples, at least of one of the first clamping surface and the second clamping surface defines a V-notch.

In some examples of the hands-free level, the stationary component and the adjustable component join together to form a cylindrical oval.

In other examples, the stationary component includes an alignment slot defined by the surface of the stationary component. The adjustable component includes an alignment tab. The alignment tab is slidably received in the alignment slot to align the adjustable component with respect to the stationary component. One example of the alignment tab further includes an eyelet to guide the elongated body of the cord.

In some examples of the hands-free level, the stationary component further includes a second set of stationary locking teeth formed on the surface of the stationary component. The second set of stationary locking teeth is spaced apart from and aligned with the set of stationary locking teeth.

In other examples of the hands-free level, the stationary component includes a cord passageway extending from the surface of the stationary component. The elongated body of the cord is routed through the cord passageway.

In some examples of the hands-free level, the stationary component includes a ring formed circumferential on the surface. The ring includes a notch defined by a discontinuity in the ring. The notch is configured to hold an end of a string line.

In other examples of the hands-free level, the adjustable component includes a retaining slot defined by two edges spaced apart. The J-shaped terminus includes a barrel. The barrel is captured by the two edges and rides along the two edges.

In some examples of the hands-free level, the level device is any one of bubble level, electronic level, and a combination thereof. In other examples, the level device includes two level devices fixed to the surface of the stationary component at a 90° angle to each other.

In other examples of the hands-free level, the level device includes at least one level device fixed to any one of the stationary component adjacent to the first clamping surface, adjustable component adjacent to the second clamping surface, and a combination thereof.

In some examples of the hands-free level, the cord further includes a barb formed at an end of the cord opposite the J-shaped terminus. The barb and the set of cord locking teeth are formed on opposed planer surfaces of the body.

In other examples of the hands-free level, the J-shaped terminus includes a hinge member and a tail end integrally formed with the hinge member. In response to advancement of the cord, the tail end contacts the adjustable component and travels in a direction at angle to the advancement. Some examples of the hinge member include webbing to limit the angle at which the tail end travels.

Other examples of the hands-free level further include at least one laser mounted to the surface of the stationary component.

BRIEF DESCRIPTION OF THE DRAWINGS

The accompanying drawings, which are incorporated in and form a part of the specification, illustrate examples of the present disclosure and together with the written description serve to explain the principles, characteristics, and features of the disclosure. In the drawings.

DETAILED DESCRIPTION

In the following detailed description of the illustrated examples, reference is made to accompanying drawings, which form a part thereof, and within which are shown by way of illustration, specific examples, by which the subject matter can be practiced. It is to be understood that other examples can be utilized and structural changes can be made without departing from the scope of the disclosure.

The particulars shown herein are by way of example and for purposes of illustrative discussion of the examples only and are presented in the case of providing what is believed to be the most useful and readily understood description of the principles and conceptual aspects of the disclosure. In this regard, no attempt is made to show structural details of the subject matter in more detail than is necessary for the fundamental understanding of the disclosure, the description taken with the drawings making apparent to those skilled in that how the several forms of the present disclosure can be embodied in practice. Further, like reference numbers and designations in the various drawings indicate like elements.

Figure 1A:
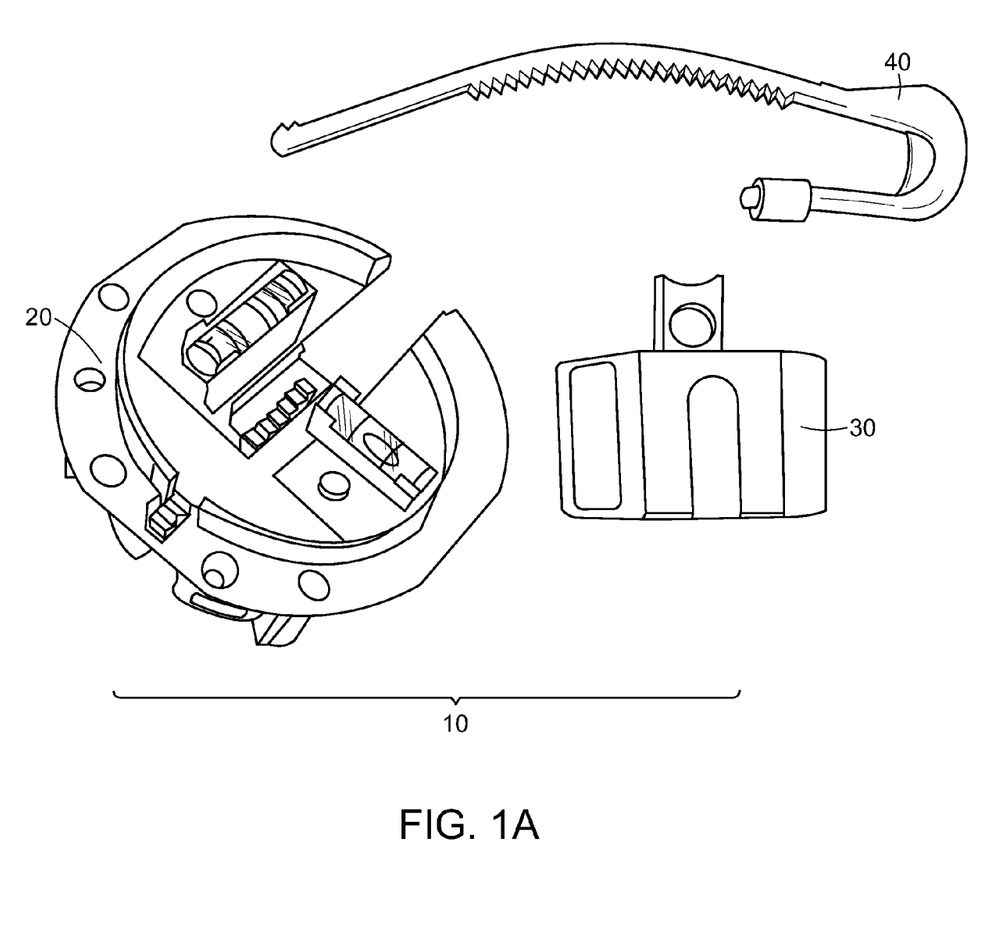
FIGS. 1A and 1B are illustrations of an example of the hands-free level in a disassembled state and in an assembled state and clamped onto a post.
Figure 1B:
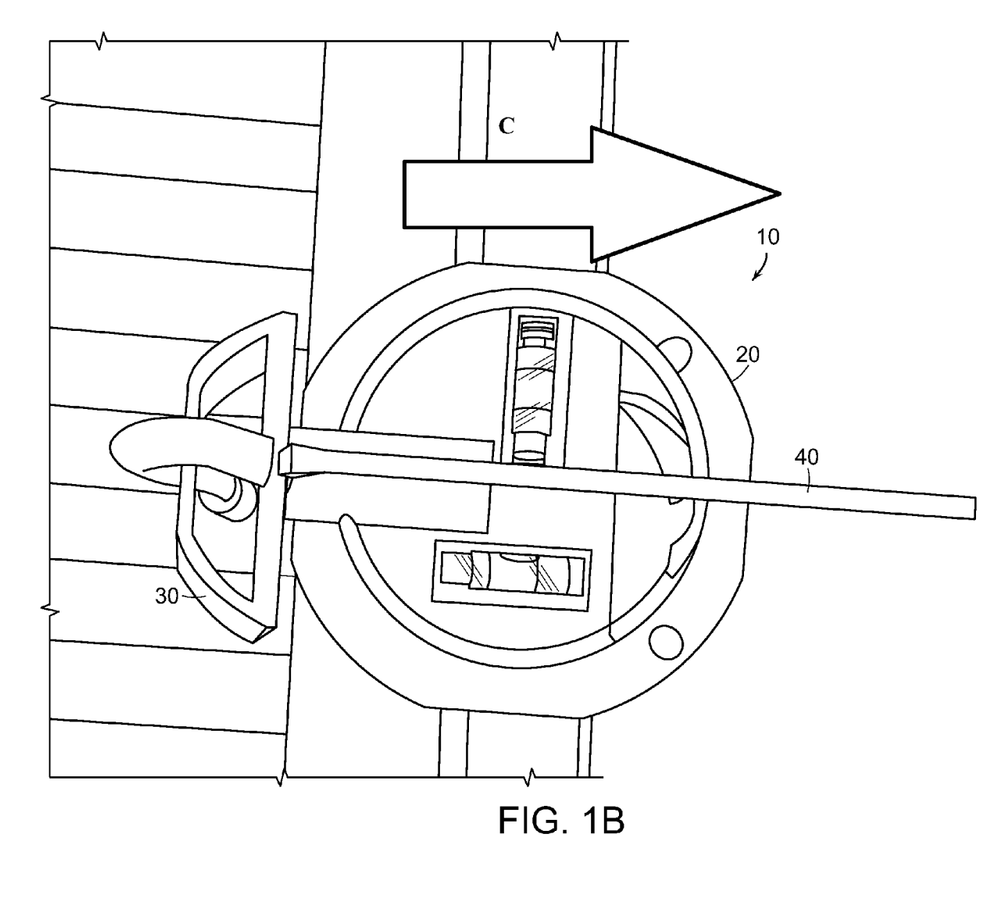

FIGS. 1A and 1B shows a hands-free level 10 including a stationary component 20, an adjustable component 30, and a cord 40. To use the hands-free level 10, for example, to plumb a post set into the ground, a user clamps the hands-free level 10 to the post. The user feeds a first end of the cord 40 through the adjustable component 30 until a second end of the cord 40 buts up against the adjustable component 30. The user holds the stationary component 20 against a face of the post with one hand. With the other hand, the user brings the adjustable component 30 with the cord 40 up to the opposing face of the post. The user then pushes the second end of the cord 40 against the adjustable component 30 in a direction towards the stationary component 20, defined herein as the clamping direction (shown as arrow labeled "C"). Locking teeth of the stationary component 20 and the adjustable component 30 hold the adjustable component 30 position. The hands-free level 10 is now clamped to the post, as shown in FIG. 1B. The user can increase the clamping force exerted by the hands-free level 10 by advancing the cord 40 further along the clamping direction.

With the hands-free level 10 clamped to the post, the user can now use two hands to move the post around while checking for plumb using one of more level devices 50 fixed to the hands-free level 10. The level devices 50 include but are not limited to spirit levels (bubble levels), electronic levels, and combinations thereof. To unclamp the hands-free level 10 from the post, the user lifts the first end of the cord 40 up to release the locking teeth.

Examples of the hands-free level 10 may lock onto building material that needs to be plumbed or leveled. For example, the hands-free level may lock onto building materials from about 1 inch to about 5.25 inches wide and having a multitude of shapes. Examples of the hands-free level 10 may allow an installer to use one tool to plumb, to level, and/or to add string/laser lines.

FIGS. 2A-D show examples of the stationary component 20. The stationary component 20 includes a surface 22 that is planar. As shown, the surface 22 is generally circular in shape but other shapes are contemplated, such as triangle, square, and other regular polygons. A convenient example includes two bubble levels 50a, 50b fixed to the surface 22 at a 90° angle—to each other.

A set of stationary locking teeth 24 is formed on the surface 22. Best shown in FIG. 2B, the stationary locking teeth 24 define a central axis (labeled as "C.A.") of the hands-free level 10. Best shown in FIG. 2C, a stationary clamping surface 26 extends from the surface 22 at a 90° angle. For the purpose of describing this and other examples of the hands-free level 10, the surface 22 defines a horizontal dimension (plane) of the hands-free level 10 and the stationary clamping surface 26 defines a vertical dimension (plane) of the hands-free level 10.

Figure 2A:
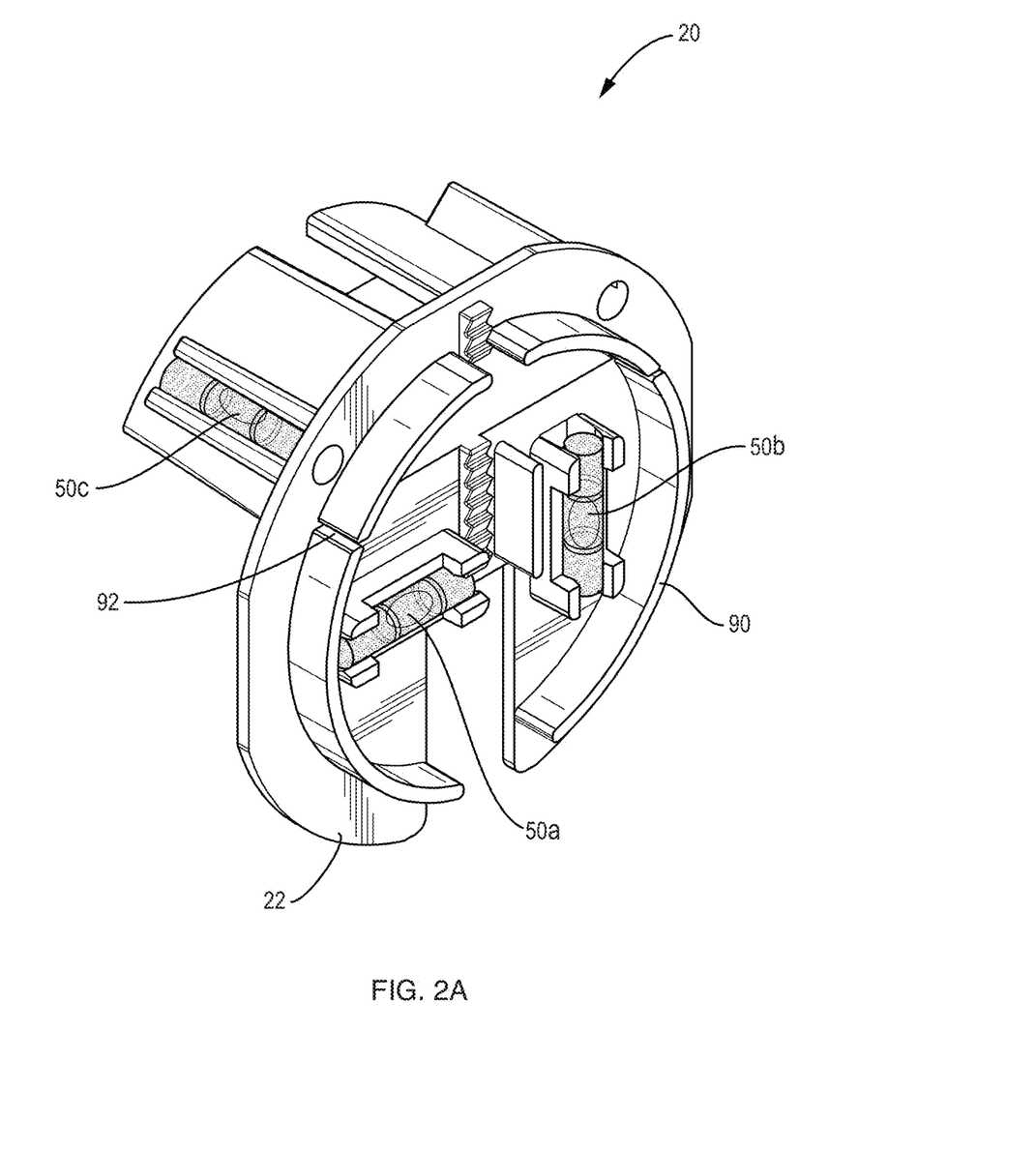
FIGS. 2A-2D are views of examples of a stationary component of the hands-free level.
Figure 2B:
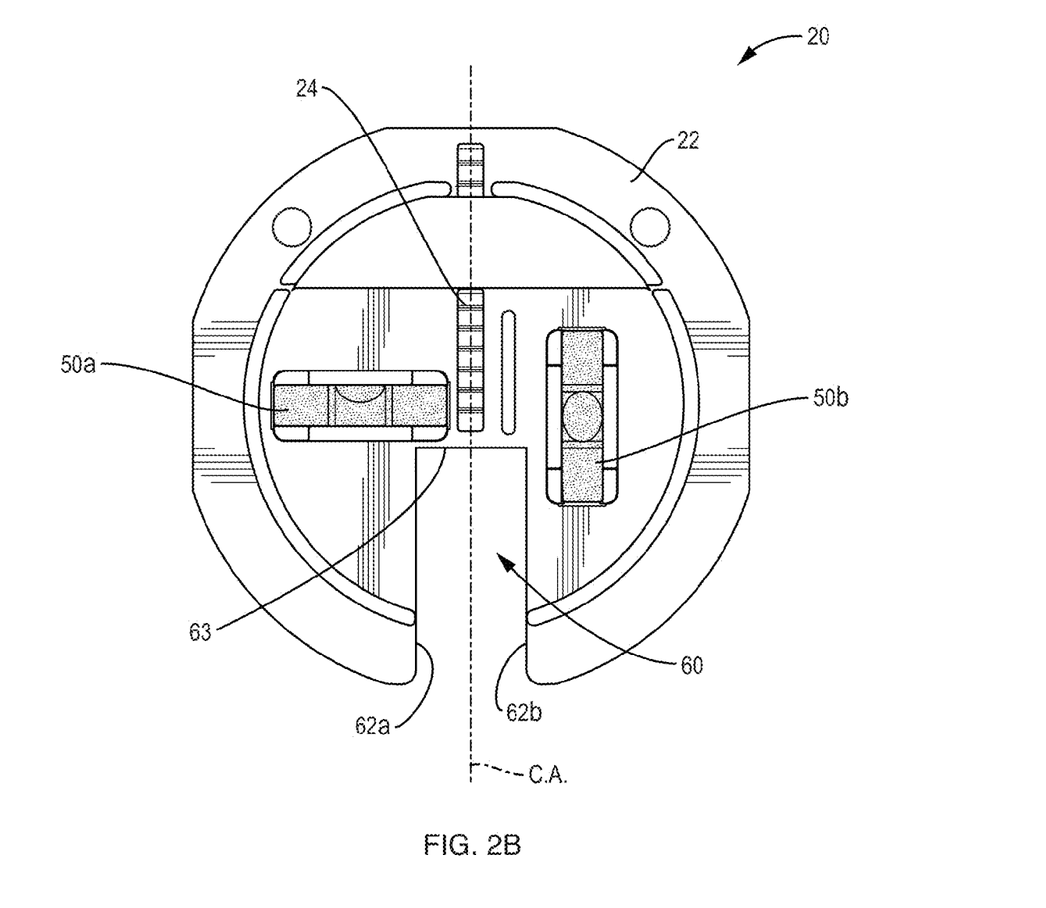
Figure 2C:
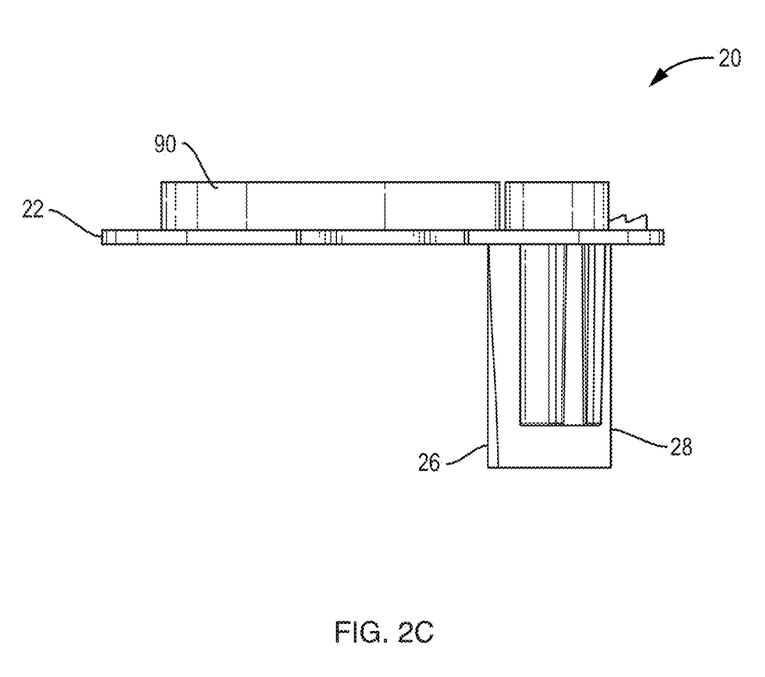
Figure 2D:
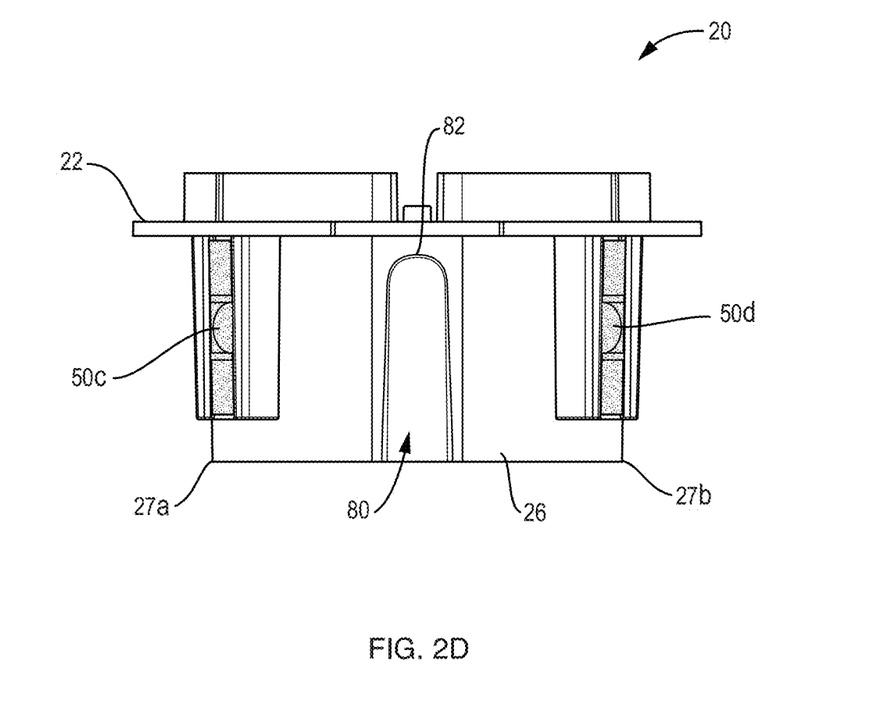

Best shown in FIGS. 2C and 2D, in a convenient example, a supporting wall 28 opposite the stationary clamping surface 26 extends between vertical ends 27a, 27b of the stationary clamping surface 26. As shown, the example includes two bubble levels 50c, 50d one on each side of the central axis of the hands-free level 10. Having multiple level devices in different locations on the hands-free level 10 makes it easier to see at least one of the level devices in any given situation. For example, a level device located so that it can been seen from below the hands-free level 10 is useful when the hands-free level 10 is clamped around an object that is above user eyelevel. Conversely, a level device located so that it can been seen from above the hands-free level 10 is useful when the hands-free level is clamped around an object that is below user eyelevel.

Figure 3A:
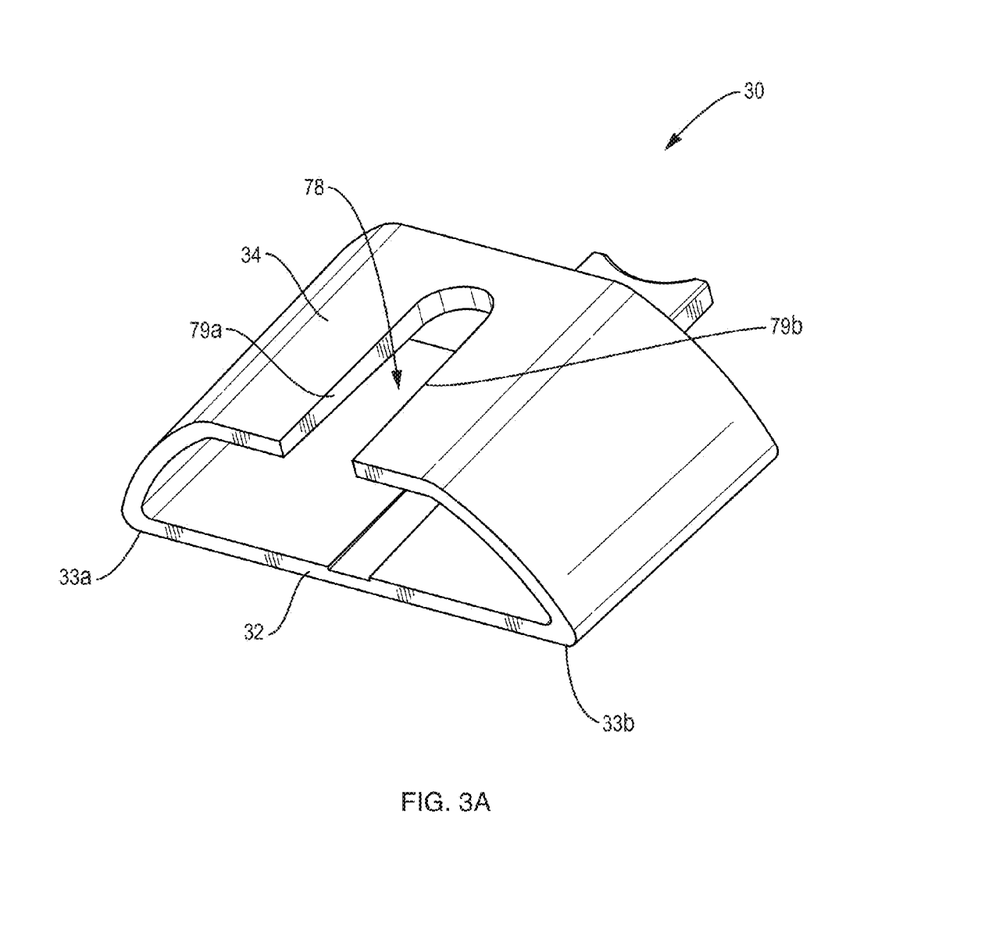
FIGS. 3A-3C are views of examples of an adjustable component of the hands-free level.
Figure 3B:
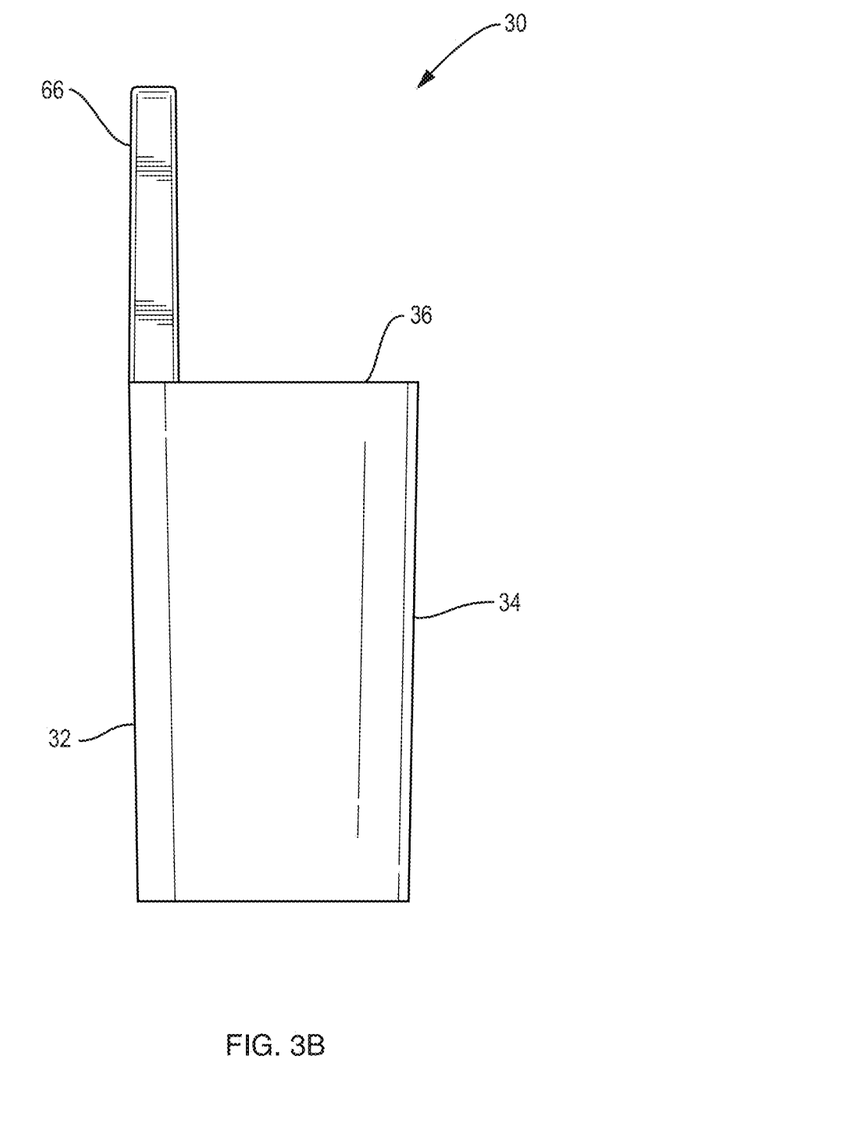
Figure 3C:
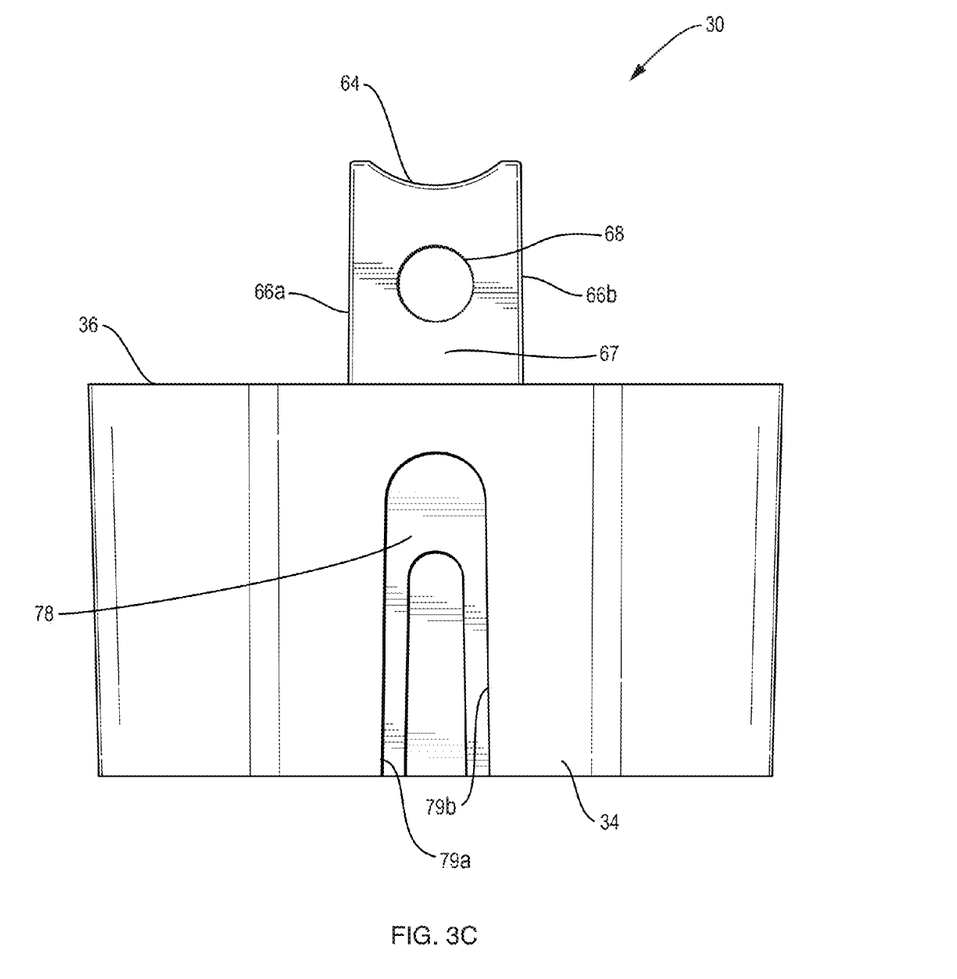

FIGS. 3A-3C show examples of the adjustable component 30. The adjustable component 30 includes an adjustable clamping surface 32 and a bracing wall 34 opposite the adjustable clamping surface 32 (best shown in FIG. 3B) extending between the ends 33a,33b of the adjustable clamping surface 32 (best shown in FIG. 3A). The adjustable clamping surface 32 and the stationary clamping surface 26 (of FIG. 2) match in the vertical dimension, i.e., the surfaces are about the same height. In a convenient example of the hands-free level 10, the stationary clamping surface 26 and the adjustable clamping surface 32 are parallel to each other. In another example, the stationary clamping surface 26 and the adjustable clamping surface 32 are at an angle to each other. Such an example is a particularly well-suited for clamping irregular objects.

In some other examples of the hands-free level 10, the stationary clamping surface 26, the adjustable clamping surface 32 or both include a V-notch. These examples are particularly well-suited for clamping round objects such as pipes and conduits.

In other examples of the hands-free level 10, the stationary clamping surface 26, the adjustable clamping surface 32 or both are textured. The texture improves the gripping performance of the hands-free level 10. In still other examples, the stationary clamping surface 26, the adjustable clamping surface 32 or both are non-marring.

In some examples of the hands-free level 10, the stationary component 20 and adjustable component 30 are aligned with each other using an slot and tab arrangement. With reference to FIG. 2B, the surface 22 of the stationary component 20 defines an alignment slot 60. The alignment slot 60 includes two horizontal edges 62a,b that are parallel to the central axis. A third edge 63, which is perpendicular to the central axis, connects the two horizontal edges 62a,b. With reference to FIGS. 3B and 3C, an alignment tab 64 extends from a horizontal edge 36 of the adjustable clamping surface 32. The alignment tab 64 includes two vertical edges 66a,b and a face 67 between the edges 66a,b.

The horizontal edges 62a,b of the alignment slot 60 and the vertical edges 66a,b of the alignment tab 64 act together to limit movement of the adjustable component 30 to either side of the central axis of the hands-free level 10 (lateral movement). Limiting side-to-side movement of the adjustable component 30 and aligning the adjustable clamping surface 32 with the stationary clamping surface 26 improves the clamping performance of the hands-free level 10.

The fit between the alignment slot 60 and alignment tab 64 maybe selected to allow a certain amount of side-to-side movement of the adjustable component 30, referred to as play. For example, there is a space between the horizontal edges 62a,b of the alignment slot 60 and the vertical edges 66a,b of the alignment tab 64. Having play between the stationary component 20 and adjustable component 30 may be preferable when clamping (off-axis) an irregular-shaped object.

The face 67 of the alignment tab 64 and the third edge 63 of the alignment slot 60 act together to form a hard stop. The hard stop limits movement of the adjustable component 30 along the central axis of the hands-free level 10 (longitudinal movement) towards the stationary component 20. In a convenient example, the face 67 is flush with the adjustable clamping surface 32. As such, the hard stop defines a minimum thickness of an object that can be clamped by the hands-free level 10.

Some examples of the alignment tab 64 include a cord guide 68 (eyelet) formed in the face 67 of the alignment tab 64. The cord guide 68, by itself or used with other guiding structures, such as a vertical wall extending from the surface of the stationary component 20, line the cord 40 up with the central axis of the hands-free level 10 and enhance the usability of the hands-free level 10.

Figure 4A:
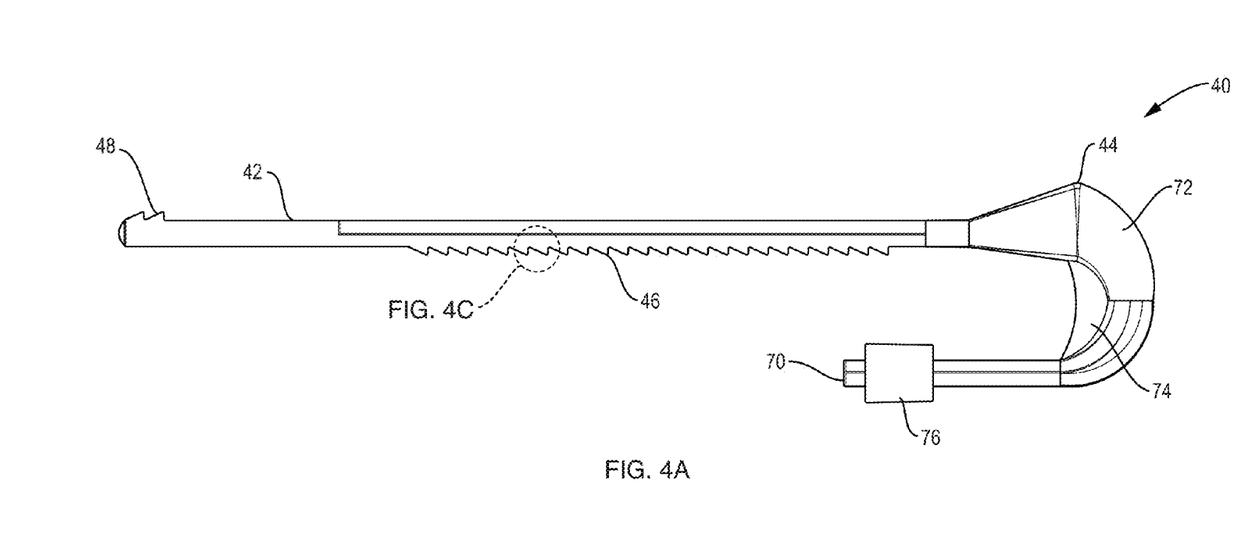
FIGS. 4A-C are views of an example of a cord of the hands-free level.

FIG. 4A shows an example of the cord 40 with an elongated body 42 terminating with a J-shaped terminus 44. A set of stationary locking teeth 24 are formed along a partial length of the elongated body 42. The arrangement of the cord locking teeth 46 is complementary to the stationary locking teeth 24 of the stationary component 20. For example, each cord locking tooth 46a includes an incline surface 45a and vertical surface 45b, as shown in FIG. 4C, similar to incline and vertical surfaces found on a corresponding stationary locking tooth. The cord locking teeth 46 engage with the stationary locking teeth 24 in a releasable interlock engagement. Continuing with the example of the stationary locking teeth 24 and cord locking teeth 46 described above, in a locking state, the vertical surfaces of stationary and cord locking teeth are in mechanical contact with on another. This inhibits the cord 40 from moving in a direction opposite the clamping direction (see FIG. 1B). The interlock engagement can be released by lifting the cord 40 up so that the vertical surfaces are in limited contact or not in contact at all. One skilled in the art will readily recognize that other arrangements are possible, such as a ratchet and pawl.

Turning now to a description of the J-shaped terminus 44. The J-shaped terminus 44 butts up against the adjustable component 20. Moving (advancing) the cord 40 in the clamping direction causes the J-shaped terminus 44 to push (urge) the adjustable component 30 in the clamping direction toward the stationary component 20. Owing to the interlock engagement described above, the adjustable component 30 resists being moving in a direction opposite the clamping direction (i.e., away from the stationary component 20). As the cord 40 advances, the adjustable component 30 continues to move towards the stationary component 20 until the adjustable component 30 contacts the object being clamped.

In a convenient example of the cord 40 shown in FIG. 4A, the J-shaped terminus 44 includes a tail end 70, which butts up against the adjustable component 30, and a hinge 72. The hinge 72 permits the tail end 70 to pivot with respect to the elongated body 42. For example, when the cord 40 is advanced in the clamping direction past the point at which the adjustable component 30 contacts the object, the tail end 70 pivots away from the elongated body 42. The result is an angle formed between the elongated body 42 and tail end 70 that enhances the clamping performance of the hands-free level 10. Some examples of the hinge 72 include webbing 74 (thickening of material) that limits the angle Owing to the hinge 72 and the multi-component design of the hands-free level 10, the hands-free level 10 can be temporarily unclamped from an object without disengaging the cord 40. This is done by pivoting the adjustable component 30 away from the stationary component 20. The is particularly useful when repetitive measuring is needed, for example, when leveling floor joists.

With reference to FIG. 4A, another example of the J-shaped terminus includes a barrel 76. With reference to FIG. 3C, the adjustable component includes a cord retaining slot 78 opposite the adjustable clamping surface 32. The cord retaining slot 78 includes two vertical edges 79a,b that capture the barrel 76 of the cord 40. This in turn couples the adjustable component 30 and cord 40 together. This is particularly useful when assembling the hands-free level 10 as described above with reference to FIG. 1. With the barrel and slot arrangement, the adjustable component 30 and cord 40 form a subassembly. The subassembly is then be joined with the stationary component 20 to complete the assembly of the hands-free level 10.

Figure 5:
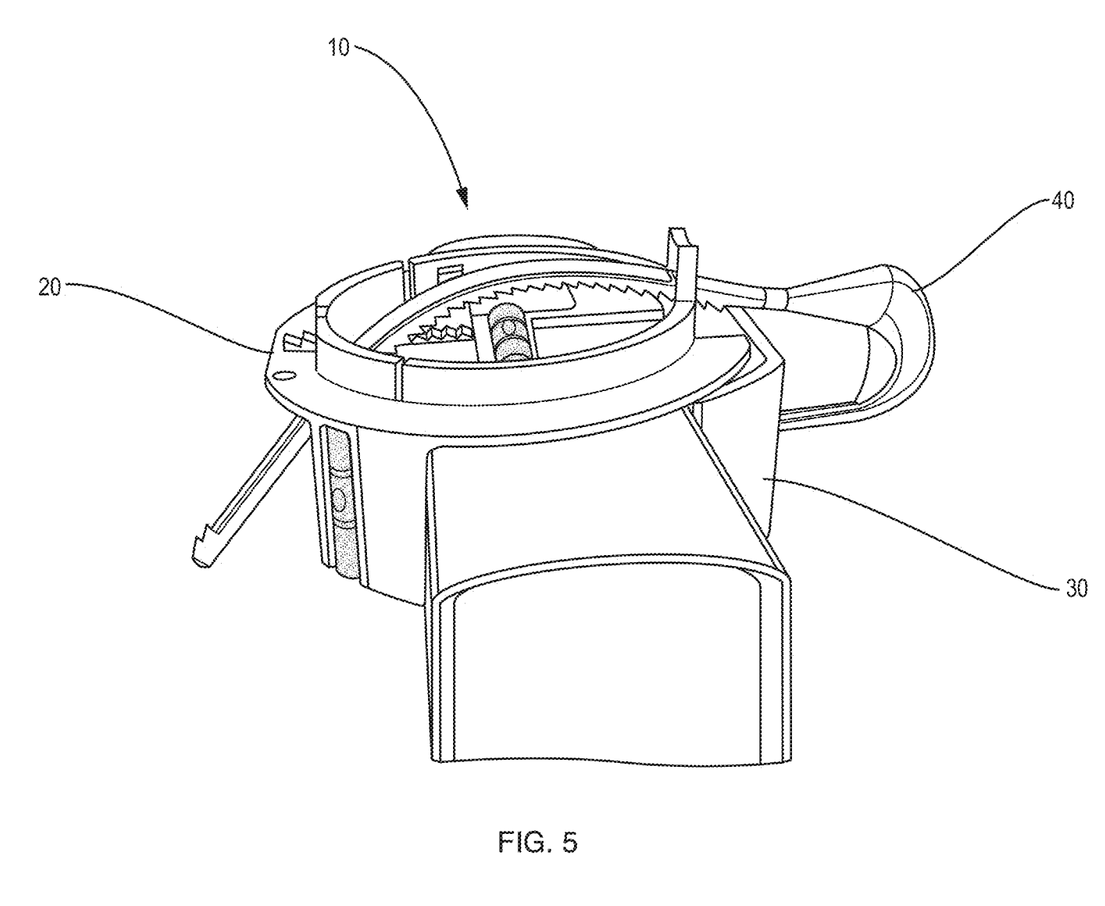
FIG. 5 is an illustration of an example of the hands-free level used in an alternative way.

FIG. 5 shows an alternative mode for using the hands-free level 10 in which the cord 40 is routed through the stationary component 20. With reference to FIG. 2D, one example of the stationary component 20 includes a cord passageway 80 with a closed-end 82. In passing the cord 40 through the cord passageway 80, a cord locking tooth engages a stationary locking tooth in a releasable interlock engagement while a planer surface opposite the engaged cord locking tooth contacts the closed end 82. As shown, in this usage mode, the cord 40 forms an arc that locks the position of the adjustable component 30. A cord guide, such as the cord guide 68 described with reference to FIG. 3, may be employed to assist the user in using the hands-free level in the alternative mode.

Figure 4B:
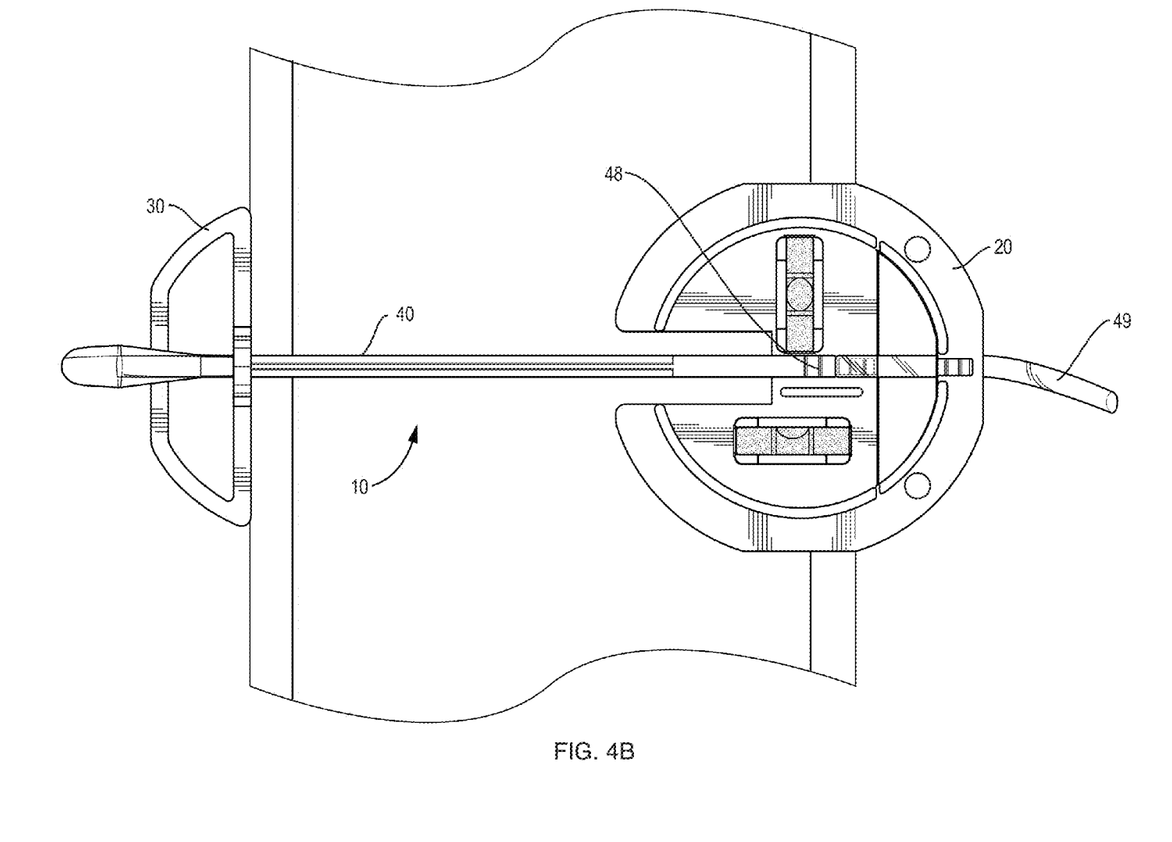
Figure 4C:
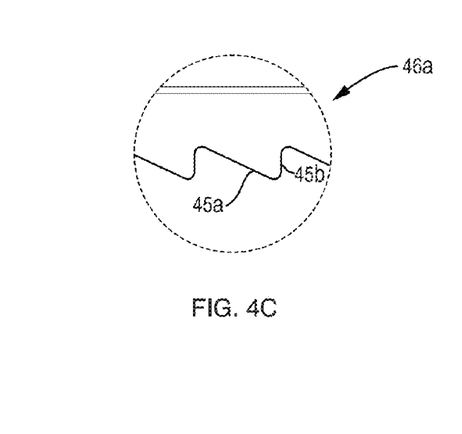

Referring to FIGS. 4A and 4B, some examples of the cord 40 include a barb 48 at an end opposite the J-shaped terminus 44. As shown, the cord locking teeth 46 and barb 48 are formed on opposite sides of the elongated body 46. The barb 48 is sized to fit inside a length of plastic tubing 49 and to retain the tubing 49. This configuration effectively lengthens the cord 40. The lengthen cord is then used in conjunction with the cord passageway 80, as described above and as best shown in FIG. 4B.

While the foregoing examples of are described in the context of using the hands-free level 10 to level and plumb an object, the hands-free level 10 maybe used in other ways for other purposes. For example, the hands-free level 10 can be used to establish a reference point or line. Referring back to FIG. 2A, a convenient example of the hands-free level 10 includes a ring 90 formed circumferential on the surface 22 of the stationary component 20. A break (discontinuity) in the ring 90 defines a notch 92 (two are shown but some examples include fewer or more notches). The notch 92 is configured to hold an end of a string line. For example, the notch 92 fixes one end of a mason line used to set a course bricks. In another example, the notch 92 sets an end of a chalk line used to snap a chalk line.

Some examples of the hands-free level 10 include one or more lasers (or a rotary laser) fixed to the surface 22 of the stationary component 20. For example, one of the level devices is replace with a laser. In other example, two lasers are mounted at a 90° angle to each other. The laser projects a point that may be used to as a reference point.

Some examples of the hands-free level 10 include other devices instead of or in addition to the level device 50. For example, in a photographic/videographic example of the hands-free level 10, the surface 22 of the stationary component 20 is outfitted with a camera mount. As described above, the hands-free level 10 can clamp a variety of objects regardless of shape making it an ideal imaging platform for us in situations where using a traditional tripod is difficult or not possible.

Examples of the hands-free level 10 can be made from any number of materials and made according to any number of manufacturing processes. For example, some or all the parts are injection molded plastic. In another example, some or all the parts are cast or machined metal. In yet another example, the hands-free level includes a combination of plastic, metal, and composite parts.

The terms comprise, include, and/or plural forms of each are open ended and include the listed parts and can include additional parts that are not listed. And/or is open ended and includes one or more of the listed parts and combinations of the listed parts. The terms about, approximately, substantially, and their equivalents may be understood to include their ordinary and customary meaning. In addition, these terms may be understood to represent values close to, but not equal to, a specified value. For example, 1%, 0.9%, 0.8%, 0.7%, 0.6%, 0.5%, 0.4%, 0.3%, 0.2%, 0.1%, etc., of a specified value.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A hands-free level, comprising;
   a stationary component including a set of stationary locking teeth formed on a surface of the stationary component;
   an adjustable component;
   at least one level device attached to at least one of the stationary component and the adjustable component;
   an cord comprising an elongated body terminating in a J-shaped terminus, the cord further comprising a set of cord locking teeth formed along a partial length of the elongated body and having an arrangement complementary to the set of stationary locking teeth, such that the set of cord locking teeth and the set of stationary locking teeth engage in a releaseable interlock engagement; and
   wherein the J-shaped terminus of the cord abuts the adjustable component and urges the adjustable component towards the stationary component in response to advancing the cord along the surface of the stationary component.

2. The hands-free level of claim 1 wherein the stationary component includes a first clamping surface extending from the surface at a 90° angle; and wherein the adjustable component defines a second clamping surface opposed to the first clamping surface.

3. The hands-free level of claim 2 wherein the first clamping surface and second clamping surface are parallel to each other.

4. The hands-free level of claim 2 wherein the first clamping surface and second clamping surface are at an angle to each other.

5. The hands-free level of claim 2 wherein at least of one of the first clamping surface and the second clamping surface is textured.

6. The hands-free level of claim 2 wherein at least of one of the first clamping surface and the second clamping surface defines a V-notch.

7. The hands-free level of claim 2 wherein the level device includes at least one level device fixed to any one of the stationary component adjacent to the first clamping surface, adjustable component adjacent to the second clamping surface, and a combination thereof.

8. The hands-free level of claim 1 wherein the stationary component and the adjustable component join together to form a cylindrical oval.

9. The hands-free level of claim 1 wherein the stationary component includes an alignment slot defined by the surface of the stationary component;
   wherein the adjustable component includes an alignment tab; and
   wherein the alignment tab is slidably received in the alignment slot to align the adjustable component with respect to the stationary component.

10. The hands-free level of claim 9 wherein the alignment tab further includes an eyelet to guide the elongated body of the cord.

11. The hands-free level of claim 1 wherein the stationary component further includes a second set of stationary locking teeth formed on the surface of the stationary component spaced apart from and aligned with the set of stationary locking teeth.

12. The hands-free level of claim 1 wherein the stationary component includes a cord passageway extending from the surface of the stationary component, the body of the cord being routed through the cord passageway.

13. The hands-free level of claim 1 wherein the stationary component includes a ring formed circumferential on the surface; and a notch defined by a discontinuity in the ring, the notch configured to hold an end of a string line.

14. The hands-free level of claim 1 wherein the adjustable component includes a retaining slot defined by two edges spaced apart; and wherein the J-shaped terminus includes a barrel, the barrel being captured by the two edges and rides along the two edges.

15. The hands-free level of claim 1 wherein the level device is any one of bubble level, electronic level, and a combination thereof.

16. The hands-free level of claim 1 wherein the level device includes two level devices fixed to the surface of the stationary component at a 90° angle to each other.

17. The hands-free level of claim 1 wherein the cord further includes a second set of cord locking teeth formed at an end of the cord opposite the J-shaped terminus; and wherein the sets of cord locking teeth are formed on opposed planer surfaces of the body.

18. The hands-free level of claim 1 wherein the J-shaped terminus includes a hinge member and a tail end integrally formed with the hinge member such that in response to advancement of the cord, the tail end contacts the adjustable component and travels in a direction at angle to the advancement.

19. The hands-free level of claim 18 wherein the hinge member includes webbing to limit the angle at which the tail end travels.

20. The hands-free level of claim 1 further comprising at least one laser mounted to the surface.

* * * * *